United States Patent [19]
Milani

[11] 3,795,471
[45] Mar. 5, 1974

[54] APPARATUS FOR SHAPING HOLLOW EXTRUDATES OF A PLASTIC MATERIAL

[75] Inventor: Giuseppe Milani, Lonate Pozzolo, Italy

[73] Assignee: Amunt S.P.A., Novara, Italy

[22] Filed: Mar. 3, 1972

[21] Appl. No.: 231,520

[30] Foreign Application Priority Data
Mar. 5, 1971 Italy .................................. 21395/71

[52] U.S. Cl..................... 425/388, 264/90, 425/405
[51] Int. Cl. .......................................... B29c 17/07
[58] Field of Search 425/326 B, 363, 385, 388, 405; 264/90, 284

[56] References Cited
UNITED STATES PATENTS

| | | | |
|---|---|---|---|
| 2,783,175 | 2/1957 | Smith et al. | 264/284 X |
| 3,099,043 | 7/1963 | Held, Jr. | 425/388 X |
| 3,178,494 | 4/1965 | Tisdale | 425/388 X |
| 3,350,484 | 10/1967 | Magill, Jr. | 264/90 |

Primary Examiner—R. Spencer Annear
Attorney, Agent, or Firm—Eric H. Waters et al.

[57] ABSTRACT

An apparatus for impressing fancy patterns on the outer surface of extrudates of a plastic material, particularly a thermoplastic material. A continuous band or web is inserted between a mould wall and the extrudate outer surface and is fed forward concurrently with the extrudate, negative pressure being employed to imprint on the extrudate the desired patterns which are reproduced on the continuously advancing web or band. Preferably, the band or web is either porous or foraminous.

7 Claims, 2 Drawing Figures

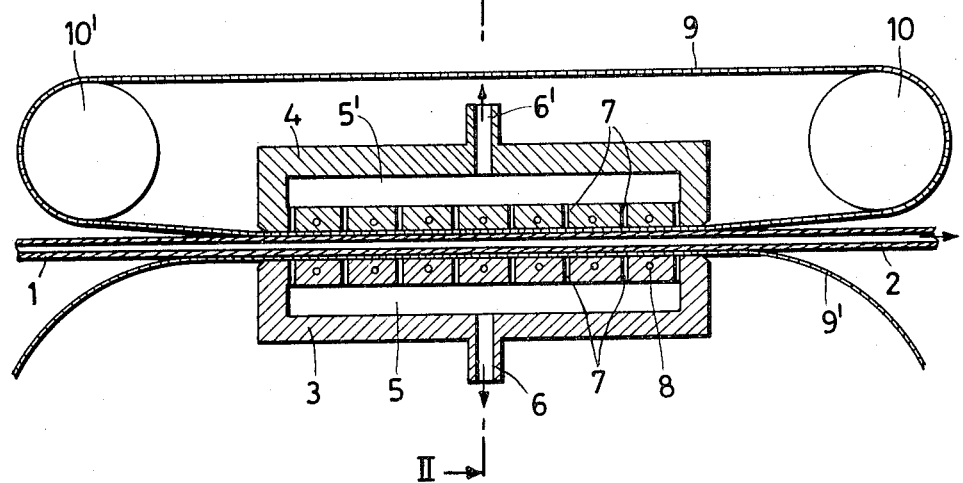
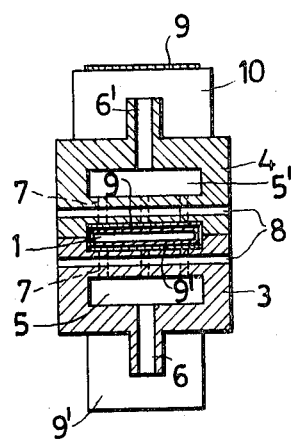

APPARATUS FOR SHAPING HOLLOW EXTRUDATES OF A PLASTIC MATERIAL

For various reasons, there is utilized a considerable mass of plastic material for goods having surfaces or surface areas opaque, rough, knurled for displaying a desired appearance. The reasons for such a demand is to be found in fashion or sometimes in technical requirements.

Difficulties are known in obtaining such desired surface characteristics, with particular reference to matt, rough, engraved or substantially smooth surfaces on thermoplastic products which are continuously extruded in hot conditions. For pressure moulded articles, the problem can be readily solved since it is satisfactory to engrave the mould surface with the desired pattern, or, as an alternative, to smooth it to any desired degree.

When single-wall extrudates are involved, the problem is solved with either opaque or knurling cylinders which calendar the article by engraving therein the pattern of their surfaces, or with smooth cylinders.

A still present problem, however, is that of continuous extrudates, which are hollow and which would be crushed under a calendar.

It is known that the continuous extrusion of hollow shapes of thermoplastic materials uses vacuum-forming devices, having the shape of the profile, in which the atmospheric pressure in the extrudate hollow space causes the outside wall of the extrudate to stick to the walls of the shaping device, causing the extrudate to take the shape thereof. With this method, the walls of the shaping devices should be smooth, at least longitudinally, since the plastic material should be allowed to slide thereover. In this respect, however, it should be observed that, in practice an irregularity is found in sliding of the material along the shaping device walls, such as due to variations of physical parameters, such as temperature, friction coefficient, viscosity and the like, of the material during progress of setting. Consequently, stresses are originated which can deform the profile both during extrusion and subsequently thereto.

This invention has as its object to permit the continuous shaping of a hollow thermoplastic profile by overcoming the above enumerated drawbacks as to the sliding of the extrudate along the shaping device walls, as well as to effect the impression under the effect of atmospheric pressure, of the desired patterns on the outer surfaces of the hollow extrudate or at least on a portion thereof.

The invention contemplates a device for the continuous shaping of hollow thermoplastic profiles, characterized in that the extrudate is caused to pass, when in its still deformable state, through a shaping mould of the negative pressure type, which is itself conventional, but previously inserting, between at least a portion of the mould inner walls and the outer walls of the extrudate, at least a shaping band having the desired patterns on its surface (for example, smooth surfaces, knurlings, grooves and the like), said band being intended to slide over the mould wall and to be fed forward continuously and at the same speed as the extrudate being formed, on which said patterns are reproduced by impression.

The shaping band, carrying the required patterns, can be provided both as a closed loop or an open loop and can drive the extrudate forward, if positively driven, or can they be driven by the extrudate if the latter is driven forward by other means.

If the band covers, in an almost complete manner, one or more of the outer surfaces of the extrudate on which the negative pressure is intended to act in the shaping mould, then the bands should be made of a pervious material or they should be pinholed. If so, paper, felt and like materials can be used as the material for the bands.

If conversely, the band covers only restricted areas of the extrudate surface and thus does not cause a substantial decrease of the effect of the negative pressure in the shaping mould, the band can also be made of an impervious material, such as a metallic or a plastic material which is incompatible in hot conditions with the material of the extrudate.

By way of illustrative example, an embodiment of the device is shown in the accompanying drawing, wherein:

FIG. 1 is a longitudinal cross-sectional view of the shaping mould for a hollow extrudate according to the invention;

FIG. 2 is a cross-sectional view thereof, taken along line II—II of FIG. 1.

The apparatus shown in the drawing is effective for shaping a tubular, flattened section, having on its outer surface, for example, knurlings.

In such a case the mould consists of two hollow plates 3–4 (thermostatically controlled if necessary), having inside walls provided with pinholes or tiny throughholes 7 which, opening into the chambers 5–5' permit, by the use of an appropriate pump (not shown) the connected to the fittings 6–6', to impart a negative pressure to the extrudate-shaping surfaces. On said surfaces, bands 9, 9' are caused to slide, band 9 being in the form of a closed loop, running between the rollers 10–10' while band 9' is an open loop which can be paid off from a roller and taken up by another roller, both rollers not being shown. Inasmuch as said bands mask the major surfaces of the extrudate on which the negative pressure is to act, they are made of a porous material, such as paper, felt and the like, or, at any rate, they are pinholed. Between said bands, which are called the shaping bands and carry on their surfaces the desired patterns, the hollow extrudate of plastic material, 1, is caused to pass in a deformable state which, upon shaping and imprinting, emerges from the opposite end in the form of a shaped hollow body 2.

If the extrudate is advanced by a drag device, the shaping bands can be entrained both by the extrudate itself or they can be positively driven by motive means. If the bands are driven by motive means, they can act, themselves, as driving mechanisms for the extrudate. The motive means (not shown) can be coupled to the idle roller 10.

The hollow plastic material 1 in the state of plasticity and capable of being shaped, is compressed, by virtue of the negative pressure impressed by the pump, by the agency of the atmospheric pressure obtaining in its interior, against the web-like walls which are displaced at the same speed as the extrudate and imprint the patterns thereon.

The plates, as in the example shown, can be equipped with ducts 8 for circulating fluids at appropriate temperatures for a satisfactory shaping and an appropriate setting of the plastic material.

In the embodiment described above, two bands are provided, which are inserted between the top and bottom surfaces of the mould, and the respective surfaces of the extrudate. Each of said bands could be split into a plurality of coplanar parallel webs, especially when extrudates having a considerable width are involved. It is also possible to partition each band longitudinally into a plurality of sequentially ordered members, which can possibly be spaced apart from each other.

In the case of extrudates having also an increased height, it is also possible to provide webs inserted between the extrudate sidewalls and the corresponding mould inner walls.

As a rule, it can be specified that it is not required to mask all the extrudate surfaces as it is caused to pass through the shaping mould, with the bands according to the present invention: it suffices, in practice, to mask those areas of the extrudate where sliding irregularities are experienced, or where it is desired to imprint a desired pattern.

I claim:

1. Apparatus for the continuous formation of hollow extrudates of thermoplastic material having a patterned surface, said apparatus comprising, a shaping mold including opposed hollow members having confronting walls between which the hollow extrudate is adapted to pass while still hot, said confronting walls of the respective hollow members being perforated, means for producing suction pressure within said hollow members, means at least one shaping band extending through said mold between one of said confronting walls and said extrudate, said shaping band having a surface facing the extrudate to form a desired surface pattern thereon, said band being constructed to permit application therethrough of suction pressure to said extrudate whereby the extrudate is urged into contact with the band, and means for advancing the band and the extrudate through the mold at the same speed.

2. Apparatus as claimed in claim 1 wherein said means for advancing the band and extrudate comprises means for driving the band which causes said band to advance and the extrudate to advance therewith.

3. Apparatus as claimed in claim 1 wherein said band is in the form of a closed loop, two rollers being provided on which the band travels such that one run of said band passes between the walls of the mold.

4. Apparatus as claimed in claim 1 wherein said band is constituted of an air pervious material.

5. Apparatus as claimed in claim 4 wherein said air pervious material is paper or felt.

6. Apparatus as claimed in claim 1 wherein said band is perforate.

7. Apparatus as claimed in claim 1 wherein two of said bands are provided, one between a respective wall and an opposite surface of the extrudate.

* * * * *

UNITED STATES PATENT OFFICE
CERTIFICATE OF CORRECTION

Patent No. 3,795,471  Dated March 5, 1974

Inventor(s) Giuseppe Milani

It is certified that error appears in the above-identified patent and that said Letters Patent are hereby corrected as shown below:

The assignee should read -- Amut S. p. A., Novara, Italy --.

Signed and Sealed this twenty-fourth Day of February 1976

[SEAL]

Attest:

RUTH C. MASON
Attesting Officer

C. MARSHALL DANN
Commissioner of Patents and Trademarks